(12) United States Patent
Tokkonen (10) Patent No.: US 7,221,948 B2
(45) Date of Patent: May 22, 2007

(54) METHOD, DEVICE ARRANGEMENT, TERMINAL DEVICE OF A CELLULAR NETWORK AND A PROGRAM APPLICATION IN THE TERMINAL DEVICE FOR GIVING A LOCATION-BASED ALERT

(75) Inventor: Timo Tokkonen, Oulu (FI)

(73) Assignee: Nokia Corporation, Espoo (FI)

( * ) Notice: Subject to any disclaimer, the term of this patent is extended or adjusted under 35 U.S.C. 154(b) by 224 days.

(21) Appl. No.: 10/867,188

(22) Filed: Jun. 14, 2004

(65) Prior Publication Data

US 2005/0009573 A1   Jan. 13, 2005

(30) Foreign Application Priority Data

Jun. 12, 2003   (FI) .................................. 20030881

(51) Int. Cl.
*H04Q 7/20* (2006.01)
(52) U.S. Cl. ............................... 455/456.3; 455/556.1; 455/414.2
(58) Field of Classification Search ............. 455/456.3, 455/414.2
See application file for complete search history.

(56) References Cited

U.S. PATENT DOCUMENTS 6,243,739 B1 * 6/2001 Schwartz et al. ........... 709/206
6,360,101 B1   3/2002 Irvin ........................... 455/456
6,973,336 B2 * 12/2005 Heie ............................ 455/574
6,983,139 B2 * 1/2006 Dowling et al. .......... 455/414.2
7,000,001 B2 * 2/2006 Lazaridis ..................... 709/217
2002/0035609 A1   3/2002 Lessard et al. .............. 709/217

FOREIGN PATENT DOCUMENTS

EP        1345148 A2    9/2003

* cited by examiner

*Primary Examiner*—Lester G. Kincaid
*Assistant Examiner*—Gary Au
(74) *Attorney, Agent, or Firm*—Harrington & Smith, PC (57) ABSTRACT

The invention relates to a method and a device arrangement utilizing the method and a mobile terminal device (14) belonging to the device arrangement, in which method for giving an alert to the user of a cellular network terminal device (14), the user at first searches for interesting objects from the information networks (12) by means of a network browser in the data processing device (11), and after that saves the linking information of the found object as a bookmark into the personal bookmark archive (13). The bookmark archive can be located either in the cellular network terminal device (14), or in some data processing device, such as a server, to which the terminal device (14) can establish a data transfer connection. The information in the bookmark archive (13) is used for giving an alert to the mobile terminal device (14) about an object that interests the user.

22 Claims, 4 Drawing Sheets

METHOD, DEVICE ARRANGEMENT, TERMINAL DEVICE OF A CELLULAR NETWORK AND A PROGRAM APPLICATION IN THE TERMINAL DEVICE FOR GIVING A LOCATION-BASED ALERT

FIELD OF THE INVENTION

Device about an object that is interesting to the user, in which method the user searches with a web browser for interesting objects from the information networks and in which the user saves the found object as a bookmark into the user's own bookmark archive and in which the information of the bookmark archive is used for giving an alert of an interesting object. The invention also relates to a device arrangement and a terminal device that utilize the method. The invention also relates to a program application to be saved in the terminal device for utilizing the method.

BACKGROUND OF THE INVENTION

People get interested in various matters. For example, they read about new and interesting matters from books, newspapers or magazines. Radio and television can also awaken a desire to familiarize oneself with a place or event better, when the circumstances allow it. Utilizing information networks, and especially the Internet, has opened up a new channel for acquiring information about interesting events, countries and places. Regardless of the method used for acquiring the basic information, the user must in one way or another record the address and other information of the interesting object for possible later use. If a person continuously records all the interesting objects for visiting or getting acquainted with, they may in time grow into such a large file/archive that utilizing it is not very easy any more. Very interesting objects can then be mixed with or disappear among less interesting material so that in a real usage situation the object which is very interesting as such remains unnoticed, although it would have been possible to get acquainted with it.

Information acquired via the Internet is becoming increasingly popular. Finding interesting information via the Internet is relatively easy. The Internet is utilized via various browser interfaces. These interfaces have been tried to be made as user-friendly as possible. If a piece of information found seems interesting, the information about how it is found, i.e. the link to a certain network address, can be saved in the program. Information like this is generally called either a bookmark or a favorite. Hereinafter, this information is called a bookmark. By means of the saved bookmark, the user can later get directly back to the same object in the information network which has aroused interest. If the person has a wide range of interests, utilizing the bookmarks may become cumbersome in time, because their number grows large if the less important bookmarks are not removed. The development of the cellular communication network and its terminal devices has made it possible to utilize the Internet by means of the browser applications also with the terminal devices of the cellular network on the market.

The state of the art technology already enables locating the user of a cellular mobile phone with substantial accuracy. In a known arrangement, location-based SMS (Short Message Service) messages are transmitted when the user moves to a certain area or approaches a certain target. In arrangements like this, all users who have arrived in a certain area generally receive a message with similar content. Examples of these messages are the messages sent by the service operators when the user comes to the service area of the service operator for the first time.

On the other hand, EP03396017.0 discloses a procedure in which user-specific context-based information is saved either into a terminal device of the cellular network or into a server connected to the cellular network. This saved information is then utilized in a context-based manner. An example of a piece of information which can be saved is a location-based alert of the user of a terminal device. When the user of the terminal device is in a certain place, the terminal device recognizes it and gives the user a reminder of an operation or task that should be performed. This user-specific information can be added or changed on the terminal device or on a computer that can be connected to the terminal device in one way or another. It is also possible for outside persons to add information which in a certain context activate an alert.

Regardless of which one of the above procedures is used, in time they result in bodies of information which are extensive and difficult to manage. The piece of information that really interests the user can either disappear in the amount of information created, or the user gets reminders so often that he does not react to them any more. In either case, the user's wish to get up-to-date reminders/alerts of certain interesting events or places is not fulfilled.

SUMMARY OF THE INVENTION

It is an objective of the present invention to provide a method and arrangement by means of which the user of a terminal device of a cellular network can be given tips or reminders based on the user's objects of interest that could be topical for the user at the moment on the basis of the location information available. Thus the user is not burdened with unimportant reminders, but the reminders are based on the person's own interest in a certain event or place.

The objectives of the invention are achieved by an arrangement in which the geographical location of the person's objects of interest is saved into a database according to the invention. This database is advantageously located in a terminal device of the cellular network used by the person. The searching and saving of information can be done advantageously on the basis of the web (World Wide Web) page and the location information contained by it. Therefore, the exact location information of the found object is added to the information to be saved, the bookmark. When the person moves, the geographical location of the terminal device of the cellular network can be determined with the desired accuracy. When the terminal device is found to be at the set criterion distance from a geographical location saved in the bookmark, the user of the terminal device is given an alert of this finding.

The invention has the advantage that the user of the terminal device of a cellular network is reminded only about matters and places with which it is possible to get acquainted on the basis of the user's current location.

In addition, the invention provides the advantage that information that the user has been interested in earlier need not be removed from the actual bookmark file, because only part of the amount of information in that file is utilized at a time. Information that is not related to the current geographical location is not utilized or even downloaded to the user's terminal device.

Furthermore, the invention has the advantage that the bookmark file downloaded or available to the terminal device can be updated via the serving cellular network when it is found that the user's geographical location has changed since the previous update.

The alerting method according to the invention, which reminds the user of a terminal device of a cellular network of a certain geographical object is characterized in that a piece of information indicating the geographical location of the object is saved into the personal bookmark archive of the terminal device user in association with the bookmark of the saved object, said piece of information being used as an alert criterion in the terminal device.

The device arrangement according to the invention, which reminds the user of a terminal device of a cellular network of a certain geographical object, is characterized in that a piece of information indicating the geographical location of the object is arranged to be saved into the personal bookmark archive of the terminal device user in association with the bookmark of the saved object, said piece of information being arranged to be used as an alert criterion in the terminal device.

The terminal device according to the invention, which reminds the user of a terminal device of a cellular network of a certain geographical object, is characterized in that the terminal device is arranged to save into its memory a bookmark of an object that interests the user and a piece of information indicating the geographical location of the object in association with the bookmark, said piece of information being arranged to be used in the terminal device as a user alert criterion.

The software application in the terminal device of the cellular network according to the invention, which reminds the user of the terminal device of a cellular network of a certain geographical object, is characterized in that it comprises

- software means for saving a bookmark of the object and a piece of information indicating its geographical location into the terminal device, and
- software means for giving an alert on the basis of the geographical location contained by the bookmarks which on the basis of the location information available to the terminal device can be reached by the terminal device user.

Some advantageous embodiments of the invention are described in the dependent claims.

The basic idea of the invention is the following: The user has a personal bookmark archive in electronic form. The bookmark archive according to the invention is advantageously located in the user's personal terminal device of the cellular network or in the SIM card (Subscriber Identity Module) of the terminal device. In another advantageous embodiment of the invention, the actual bookmark archive can be located in the user's personal computer or some server to which the user's cellular network terminal device can establish a data transfer connection. The bookmarks that are topical at the current moment can be transferred to the user's terminal device from this external archive when required. In both embodiments, all the objects and places that interest the user are saved in the bookmark archive according to the invention. In addition to the content of the objects, this file contains the geographical location information of the object. This information can either be inputted to the bookmark archive by the user or they can be transferred to it automatically when the user is utilizing the services provided by the Internet, for example. The user can thus save the link to the web page as a bookmark into the personal bookmark archive. In addition to the link to the web page, the geographical location of an object associated with the web page is advantageously saved into the bookmark created. However, the user of the data processing device/terminal device must always give permission for saving the location information of the bookmark. The saved geographical location is then used for determining the information that can give a reminder to the terminal device user. Advantageously, only objects that can be reached on the basis of the geographical location of the user give a reminder. If the geographical location of the user changes, in one advantageous embodiment of the invention in which the actual bookmark archive is outside the terminal device, the information that cause the reminder can be updated to the user's terminal device via a suitable cellular network. The procedure according to the invention is thus only used to remind the user of the matters and places which can be examined or visited on the basis of the person's current determined geographical location.

BRIEF DESCRIPTION OF THE DRAWINGS

In the following, the invention will be described in more detail. Reference will be made to the accompanying drawings, in which.

DETAILED DESCRIPTION

Figure 1:
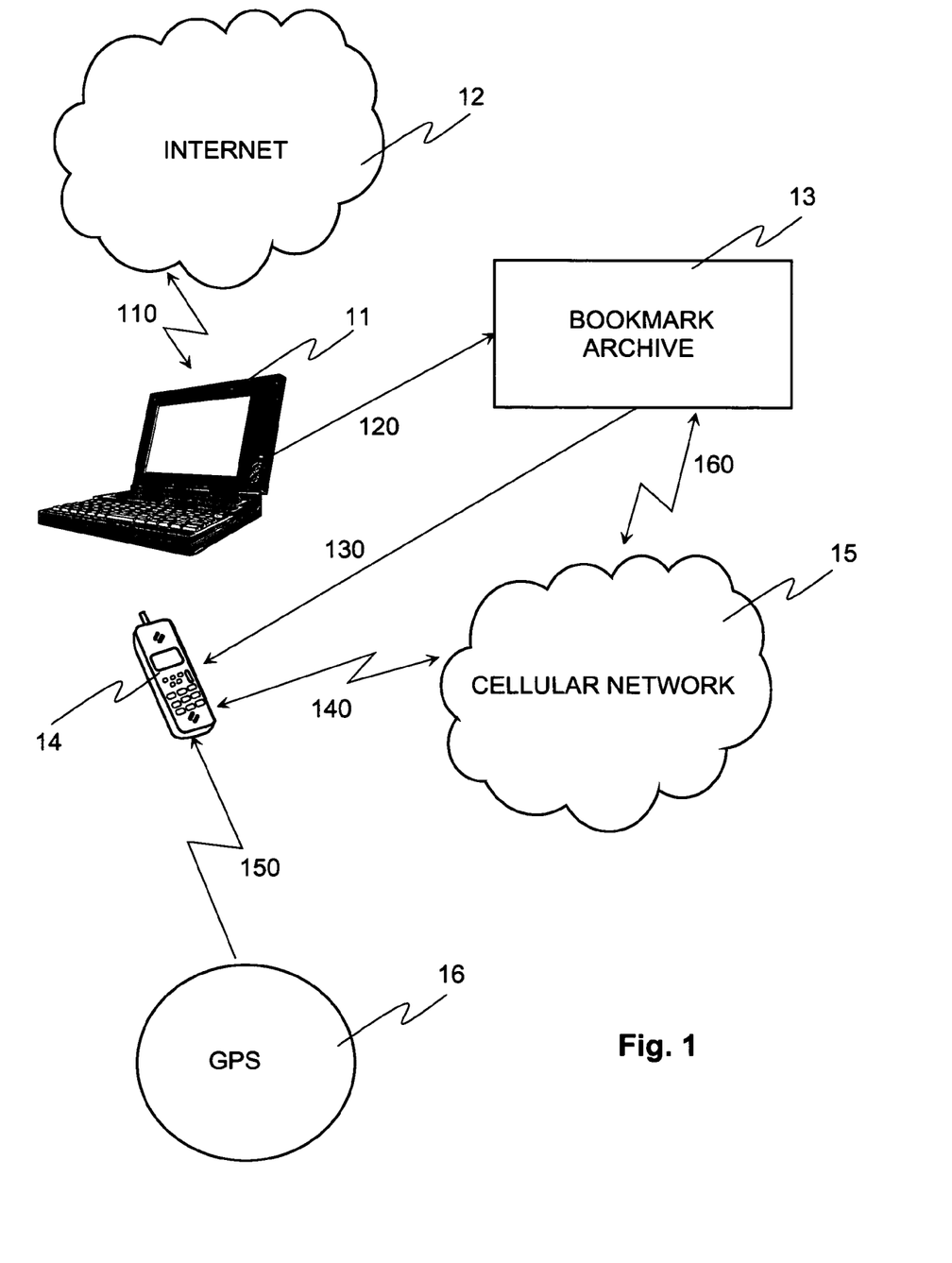
FIG. 1 shows, by way of example, an arrangement according to the invention for utilizing the bookmark information.

FIG. 1 shows, by way of example, how the arrangement according to the invention can be utilized. The devices and systems shown in FIG. 1 are intended only to illustrate the use of the invention. Reference number 11 denotes a data processing device by which the person using the data processing device can be connected via a data transfer connection 110 to the Internet 12. Web links that are interesting to the person can be found in the Internet 12. These links advantageously also include information about the geographical location of the object presented in the web page.

In the arrangement according to the invention, this information is saved as a bookmark in the user's personal bookmark archive 13. In the example of FIG. 1, the bookmark archive 13 is a separate entity of its own, to which the data processing device 11 is connected via the data transfer connection 120. It is obvious to a person skilled in the art that said bookmark archive 13 can advantageously also be located in the terminal device 14 of the cellular network used by the person, the computer 11 used by him, on a separate smartcard or a server connected to a data transfer network. Regardless of the location of the personal bookmark archive 13 used by the person, it must at least be possible to establish a data transfer connection to it with a terminal device 14. The data transfer connection established can be any prior art direct data transfer connection 130, or it can advantageously also be established via a cellular network 15, reference numbers 140 and 160.

The terminal device 14 of the cellular network moves along with its user. The geographical location of the user is advantageously determined by some prior art procedure. In can be determined by means of the GPS (Global Positioning System), for example. In that case, the terminal device 14 includes a GPS positioning device, which receives signals 150 from satellites of the GPS system 16, and performs positioning on the basis of these signals 150. The location of the terminal device 14 can also be determined by using the information of the cellular network 15. Then the terminal device can be coarsely located by means of a serving cell, for example. A more exact positioning can be carried out by transit time or reception power measurements by means of different base stations of the cellular network. It is also possible to carry out positioning at the request of the terminal device user. For example, the user sends the name of the desired object or the name of the locality to the server, which transmits the bookmarks associated with the location together with more exact location information as a reply message.

Regardless of the procedure used in positioning, the terminal device 14 uses the received location information in the following manner. When the positioning shows that an object of which the user has made a bookmark is closer than the distance used as an alert criterion, the terminal device 14 gives an alert/reminder of it to the user of the terminal device. The alert according to the invention can be given by bringing the address of the object associated with the bookmark to the display of the terminal device, for example.

If the actual bookmark archive 13 is outside the terminal device 14, the invention can be advantageously applied in at least two ways. In the first alternative, the terminal device 14 advantageously updates the new, most topical bookmarks from the bookmark archive 13 into its memory, if the location information shows that the geographical location of the terminal device 14 has changed sufficiently since the previous update. After this, the terminal device 14 gives an alert when required in the above described manner.

In the second alternative procedure, the terminal device 14 determines its location itself or receives information about its location from the serving network. The location information of the terminal device 14 is transmitted to the bookmark archive 13 outside the terminal device 14, in which a comparison is carried out between the current location of the terminal device 14 and the location information in the bookmark archive 13. If a bookmark close to the terminal device 14 is found from the bookmark archive 13, an alert is transmitted to the terminal device 14. In this embodiment, the terminal device 14 thus only performs the positioning, and other operations according to the invention are arranged in connection with the bookmark archive 13.

In the example shown by FIG. 1, the data processing device 11 used as the browser, the bookmark archive 13 and the terminal device 14 of the cellular network are shown as separate devices. As mentioned before, the devices shown in FIG. 1 can be one and the same mobile terminal device 14 or 11, by which a connection is established to the web pages found in connection with the Internet, and which has sufficient memory capacity to allow part of it to be used by the bookmark archive 13. In connection with the terminal device 14 of the cellular network 15, the bookmark archive 13 or at least the active part thereof can advantageously be located in the SIM card belonging to the terminal device 14.

Figure 2A:
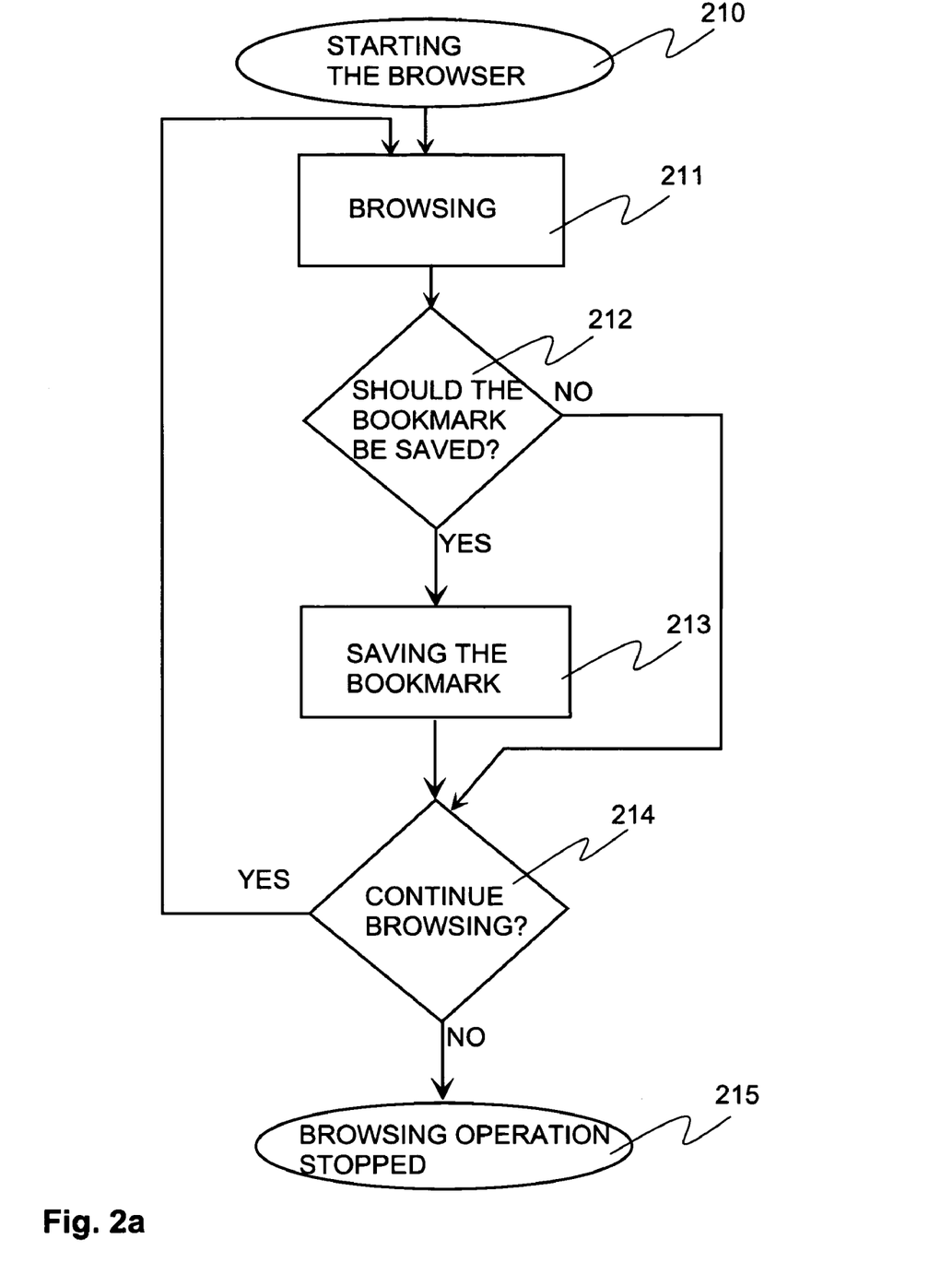
FIG. 2a shows, by way of example, a flow chart of creating a bookmark archive according to the invention.

FIG. 2a shows as an exemplary flow chart how the process of saving bookmarks into the bookmark archive 13 according to the invention takes place. In step 210, the browser program of the terminal device 14 or data processing device of the cellular network is started. In step 211, web pages that interest the user are searched for from the data transfer network. When an interesting web page has been found, it is decided in step 212 whether to save it as a bookmark or not. If the decision is not to save it, the next step is 214, in which it is decided whether to continue the browsing operation, return to step 211, or to stop the process, step 215.

If it is decided to save the bookmark in step 212, the next step is 213. Then the geographical location of the object presented by the web page is saved with the bookmark in addition to the link to the web page into the bookmark archive 13. The location information of the object to be saved can advantageously be part of the content of the web page and automatically available, but saving the location information must be accepted by the user to cause the location information to become a part of the bookmark being created.

Figure 2B:
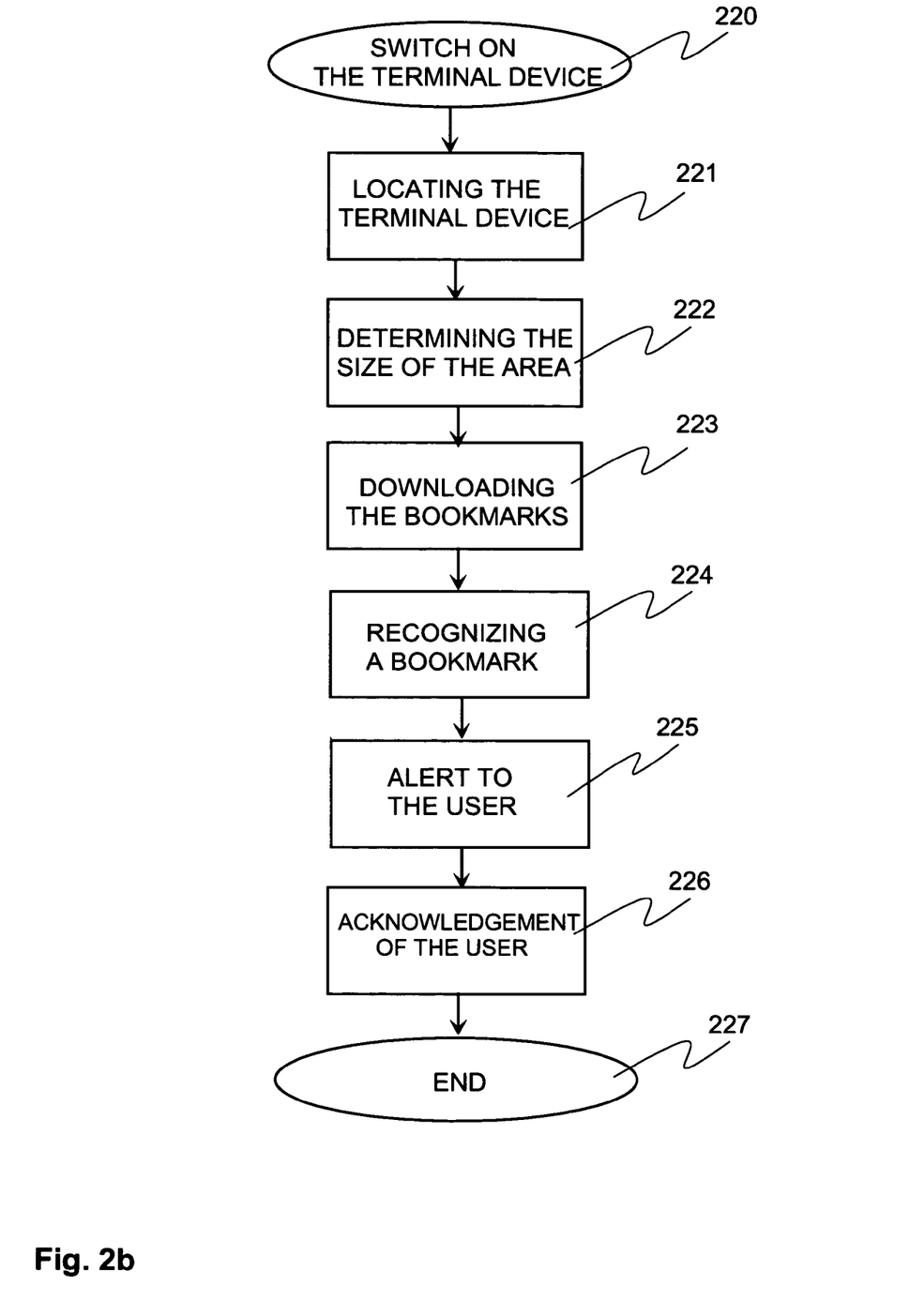
FIG. 2b shows, by way of example, a flow chart of utilizing a bookmark archive according to the invention.

FIG. 2b shows as an exemplary flow chart how the bookmarks according to the invention are advantageously utilized. In step 220, the mobile terminal device 14 is switched on or it changes the serving cell or possibly the service operator. After this, at least a coarse positioning of the terminal device 14 is performed in the next step 221. The positioning can be performed advantageously either by using the GPS or by means of the serving cellular network or by some other prior art method.

In step 222, it is decided from how large a geographical area the bookmark information is utilized/searched for in the terminal device 14. The kind of object that can be regarded as reachable at the moment can vary according to the case. If the user of the mobile station is moving on foot, for example, the distance to the reachable objects cannot be more than a few kilometers. On the other hand, if the user of the terminal device is driving a car, the distance to a reachable object increases to tens or hundreds of kilometers. Hence the area from which bookmarks are searched for in the terminal device 14 can vary. Therefore, the speed per time period at which the user of the terminal device 14 moves is advantageously taken into account in connection with the use. Naturally, the user can also specify from how large a geographical area the bookmarks are downloaded to the terminal device 14 when required or from how large an area the bookmarks are searched for.

In step 223, the bookmarks of the bookmark archive 13 that on the basis of the location information and the reachability information are so close that it is possible to get acquainted with them are downloaded to the terminal device 14 or taken into use by the terminal device 14. Downloading the bookmarks is required only in such an embodiment of the invention in which the actual bookmark archive 13 is not located in the terminal device 14.

In step 224, it is detected that the terminal device 14 is at a certain criterion distance from the object downloaded to the memory of the terminal device 14. This criterion distance preferably depends on the speed at which the user of the terminal device 14 is moving or alternatively on the determination of the criterion distance by the user.

In step 225, the terminal device 14 gives an alert in one way or another to the user. The alert to be given to the user can be either an alert generated by the terminal device 14, if the bookmark archive or a part thereof is in the terminal device 14, or an alert concerning one bookmark, which is sent to the terminal device 14 from an external bookmark archive 13. The alert given to the user can in the form of text, sound, image or vibration. In step 226, the user acknowledges the alert received and simultaneously gets through the terminal device 14 information that tells from which bookmark/object the alert was obtained and how far it is located. The exact address information of the object can also be transmitted to the user. If there is a map application available in the terminal device 14, the location of the object shown by the bookmark can be pointed out by means of this map. At the end of step 226, the user of the terminal device 14 can remove and/or save the information received from the display of the terminal device 14.

For one bookmark, the process according to the invention ends at step 227, in which the terminal device 14 is led to a state in which it does not give a new alert of the same bookmark at least for a certain period of time specified by the user. Another possible alert restriction prevents giving a new alert if the user has not left the area for which the bookmarks can give an alert. This procedure prevents the undesirable situation that an alert is given for the same bookmark/object every time when the positioning of the terminal device is carried out or when the terminal device is switched on.

Figure 3:
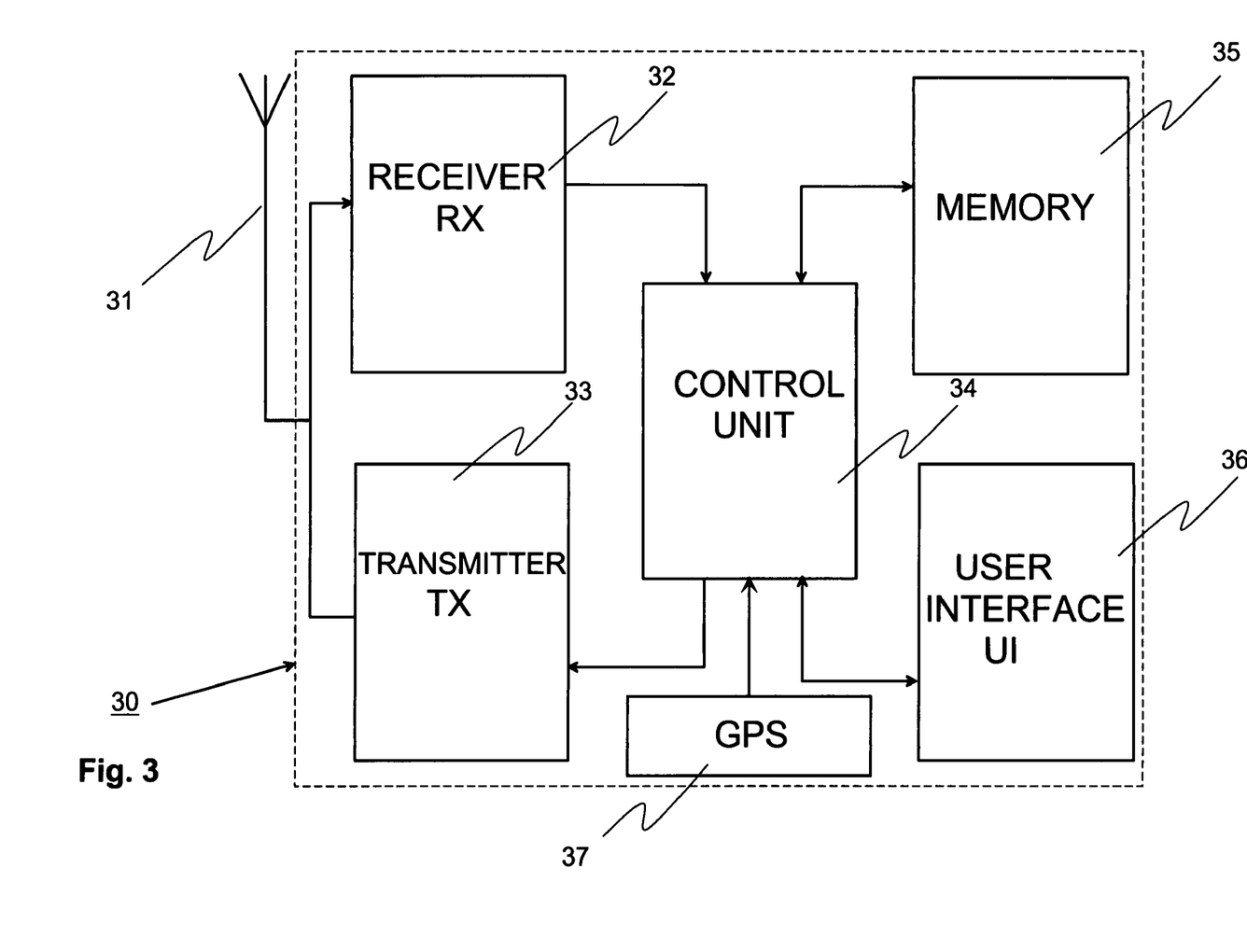
FIG. 3 shows, by way of example, the main functional components of a terminal device utilizing the procedure according to the invention.

FIG. 3 shows, by way of example, the main parts of a mobile terminal device 30 that belongs to the arrangement according to the invention. The terminal device 30 uses an antenna 31 for signal transmission and reception. Reference number 32 denotes the equipment that constitute the receiver RX, by which the mobile terminal device 30 receives from the cellular network 15. The receiver RX comprises prior art equipment for all messages or signals to be received.

Reference number 33 denotes the equipment that constitute the transmitter TX of the mobile terminal device. The transmitter means 33 perform on the signal to be transmitted all the signal processing operations needed when working with the cellular network 15.

With regard to utilizing the invention, the central operational unit in the terminal device is the control unit 34 that controls the operation of the terminal device 30. It controls the operation of all the main parts of the terminal device 30. It controls both reception and transmission. It is also used to control both the user interface UI 36 of the terminal device and the memory 35 of the terminal device. If the terminal device 30 also includes a GPS device 37, in the method according to the invention the control unit 34 utilizes the location information received from the GPS device.

In the device arrangement according to the invention, the control unit 34 determines when and from which geographical area the bookmarks according to the invention are possibly used or downloaded to the terminal device 30. In a similar manner, it decides on the basis of the location information received whether to give an alert to the user of the terminal device 30 or not. These procedures are advantageously implemented by software applications saved in the memory 35 of the terminal device that implement the procedures of FIGS. 2a and 2b.

The user interface UI 36 is used for controlling the functions of the terminal device and for the alerts and messages given to the user of the terminal device.

The terminal device 30 shown in FIG. 3 can be a fixed part of a means of conveyance, such as a car. As integrated into a car, the arrangement according to the invention can advantageously be added as part of a drive control arrangement known as such, which means e.g. an arrangement for informing the driver by means of a map base and GPS, for example. By this arrangement, the driver of a vehicle can be informed in a real-time manner of the objects of which the driver has made bookmarks to a personal bookmark archive.

Some embodiments according to the invention have been described above. The invention is not limited to the embodiments described above. For example, preventing the repetition of an alert can also be achieved by other means than those described in the examples. In addition, the inventive idea can be applied in many different ways within the scope defined by the attached claims.

The invention claimed is:

1. A method for providing an alert about an object, the method comprising:
    searching for objects from information networks by means of a network browser;
    saving the information of the object as a bookmark in a personal bookmark archive, the information comprising a piece of information indicating a geographical location of the object, wherein acceptance of the piece of information causes the geographical location information of the object to become part of the bookmark; and
    using the piece of information of the bookmark indicating the geographical location of the object as an alert criterion in a terminal device.

2. The method according to claim 1 wherein the bookmark archive used is in the terminal device of the cellular network.

3. The method according to claim 2 wherein only bookmarks from the bookmark archive that are accessible by the terminal device are utilized for providing an alert in the terminal device.

4. The method according to claim 3 wherein the alert is provided only of the bookmarks in the memory of the terminal device that are accessible on the basis of a geographic proximity of the terminal device.

5. The method according to claim 4 wherein the positioning of the terminal device is carried out either by means of GPS or by utilizing a cellular network serving the terminal device.

6. The method according to claim 3 wherein after the received alert, no alert is provided for the bookmark during a specified period of time or before the terminal has left the area in which the alert was provided.

7. The method according to claim 1 wherein the bookmark archive is located in a data processing device or in a server in a data transfer network, from which the bookmarks of a certain geographical area are transferred to the terminal device for providing the alert.

8. A device arrangement for providing an alert to a terminal device of a cellular network, the device arrangement comprising a data processing device with a network browser for searching for objects from information networks; a user-specific electronic bookmark archive for saving linking information of the objects found from the information network as bookmarks, the linking information comprising a piece of information indicating the geographical location of the object, wherein acceptance of the piece of information causes the geographical location information of the object to become part of the bookmark, the piece of information being arranged as an alert criterion in the terminal device, and a mobile terminal device of a cellular network, to which bookmarks of the bookmark archive can be transferred for providing an alert about an object of interest.

9. The device arrangement according to claim 8 wherein the bookmark archive is in a server connected to the cellular network.

10. The device arrangement according to claim 9 wherein bookmarks of only the objects that are accessible by the terminal device are arranged to be downloaded to the mobile terminal device from the bookmark archive.

11. The device arrangement according to claim 10 wherein the alert to the terminal device is arranged to be provided of a bookmark in the bookmark archive that on the basis of the location of the terminal device is accessible by the terminal device.

12. The device arrangement according to claim 11 wherein the positioning of the terminal device is arranged to be carried out either by means of GPS or by utilizing a cellular network serving the terminal device.

13. The device arrangement according to claim 11 wherein after acknowledgement of the received alert, no alert is provided for the bookmark during a specified period of time or before the terminal has left the area in which the alert was provided.

14. A terminal device of a cellular network, the terminal device comprising: means for transmitting and receiving messages, a control unit, a memory, a user interface, and a world wide web browser, the terminal device being arranged to save in its memory a world wide web browser bookmark of an object and a piece of information indicating the geographical location of the object associated with the world wide web browser bookmark, wherein acceptance of the piece of information causes the geographical location information of the object to become part of the bookmark, the piece of information being arranged to be used in the terminal device as a criterion for alerting the user.

15. The terminal device according to claim 14 which also comprises means for determining the geographical location of the terminal device.

16. The terminal device according to claim 15 wherein the means for determining the geographical location of the terminal device comprise a GPS positioning device.

17. The terminal device according to claim 14 wherein the world wide web browser bookmarks saved in the terminal device and the location information of the objects associated with the world wide web browser bookmarks constitute a bookmark archive.

18. The terminal device according to claim 17 wherein only world wide web browser bookmarks of the bookmark archive that are accessible by the terminal device are arranged to be utilized as alert criteria in the mobile terminal device.

19. The terminal device according to claim 18 wherein the alert is arranged to be provided of world wide web browser bookmarks in the memory of the terminal device that are accessible based on proximity to the terminal device.

20. The terminal device according to claim 14 wherein after an acknowledged received alert, the terminal device provides no further alert during a specified period of time or before the the terminal has left the area in which the alert was provided.

21. The terminal device according to claim 14 wherein the world wide web browser bookmarks of only the objects that is accessible by the terminal device are arranged to be saved into the mobile terminal device from an external bookmark archive.

22. A computer program saved in a terminal device of a cellular network comprising: computer readable code means for saving a world wide web browser bookmark archive, which world wide web browser bookmark comprises a piece of information indicating the geographical location of the world wide web browser bookmark, wherein acceptance of the piece of information causes the geographical location information of the object to become part of the bookmark, computer readable code means for processing location information received by the terminal device, and computer readable code means for providing an alert on the basis of the geographical location contained by the world wide web browser bookmark, the world wide web browser bookmark being accessible by the terminal device on the basis of the location information available to the terminal device.

* * * * *

UNITED STATES PATENT AND TRADEMARK OFFICE
CERTIFICATE OF CORRECTION

PATENT NO. : 7,221,948 B2 Page 1 of 1
APPLICATION NO. : 10/867188
DATED : May 22, 2007
INVENTOR(S) : Timo Tokkonenb

It is certified that error appears in the above-identified patent and that said Letters Patent is hereby corrected as shown below:

IN THE CLAIMS:

Claim 22, column 10, line 22 after "bookmark" insert --in a bookmark--.

Signed and Sealed this

Seventeenth Day of July, 2007

JON W. DUDAS
*Director of the United States Patent and Trademark Office*